US010924659B1

(12) United States Patent
Lynch

(10) Patent No.: US 10,924,659 B1
(45) Date of Patent: Feb. 16, 2021

(54) ELECTRONIC DEVICE WITH IMAGE CAPTURE AND STIMULUS FEATURES

(71) Applicant: Apple Inc., Cupertino, CA (US)

(72) Inventor: Stephen B. Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 16/286,404

(22) Filed: Feb. 26, 2019

(51) Int. Cl.
*H04N 5/232* (2006.01)
*G06F 3/041* (2006.01)

(52) U.S. Cl.
CPC ..... *H04N 5/23222* (2013.01); *H04N 5/23229* (2013.01); *H04N 5/23293* (2013.01); *G06F 3/041* (2013.01)

(58) Field of Classification Search
CPC ......... H04N 5/23293; H04N 5/232933; H04N 5/232935; H04N 5/232939; H04N 5/232; H04N 5/23229; H04N 5/23222; G06F 3/041
See application file for complete search history.

(56) References Cited

U.S. PATENT DOCUMENTS

| | | | | |
|---|---|---|---|---|
| 9,891,706 | B2 * | 2/2018 | Ha | H04M 1/72522 |
| 2006/0044396 | A1 * | 3/2006 | Miyashita | H04N 5/2258 348/207.99 |
| 2019/0190970 | A1 * | 6/2019 | Systrom | H04L 65/4076 |
| 2020/0118343 | A1 * | 4/2020 | Koblin | H04N 5/23293 |

* cited by examiner

*Primary Examiner* — Ahmed A Berhan
(74) *Attorney, Agent, or Firm* — Morgan, Lewis & Bockius LLP

(57) ABSTRACT

Portable electronic devices can be provided with stimulus features for the benefit of the subject to be captured in an image. Such stimulus features can attract the attention of the subject toward the camera when provided by components that are integrated with or coupled to the electronic device. The stimulus features can attract the attention and gaze of the subject prior to and during capture of the image. The stimulus features can also be provided to the subject as a reward during and after capture of the image. These features allow the user of the electronic device to focus on operation of the electronic device.

19 Claims, 3 Drawing Sheets

300
RECEIVE FIRST USER COMMAND — 302
PROVIDE FIRST INTERACTIVE FEATURE — 304
RECEIVE SECOND USER COMMAND — 306
CAPTURE IMAGE — 308
PROVIDE SECOND INTERACTIVE FEATURE — 310

ELECTRONIC DEVICE WITH IMAGE CAPTURE AND STIMULUS FEATURES

TECHNICAL FIELD

The present description relates generally to electronic devices, and, more particularly, to portable electronic devices (e.g., smartphones) for capturing images and providing stimulus features.

BACKGROUND

Portable electronic devices are often provided with camera functionality to capture images and video. Such electronic devices can include a mobile communication device that can include or take the form of a smartphone or a tablet computer device. A display provided on the electronic device provides a view of an image before and after the image is captured. User input and feedback features provide an ability for a user to interact with the electronic devices to control how and when the image is captured. Further features of the electronic device allow a user to save, edit, delete, or transmit the image as desired.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
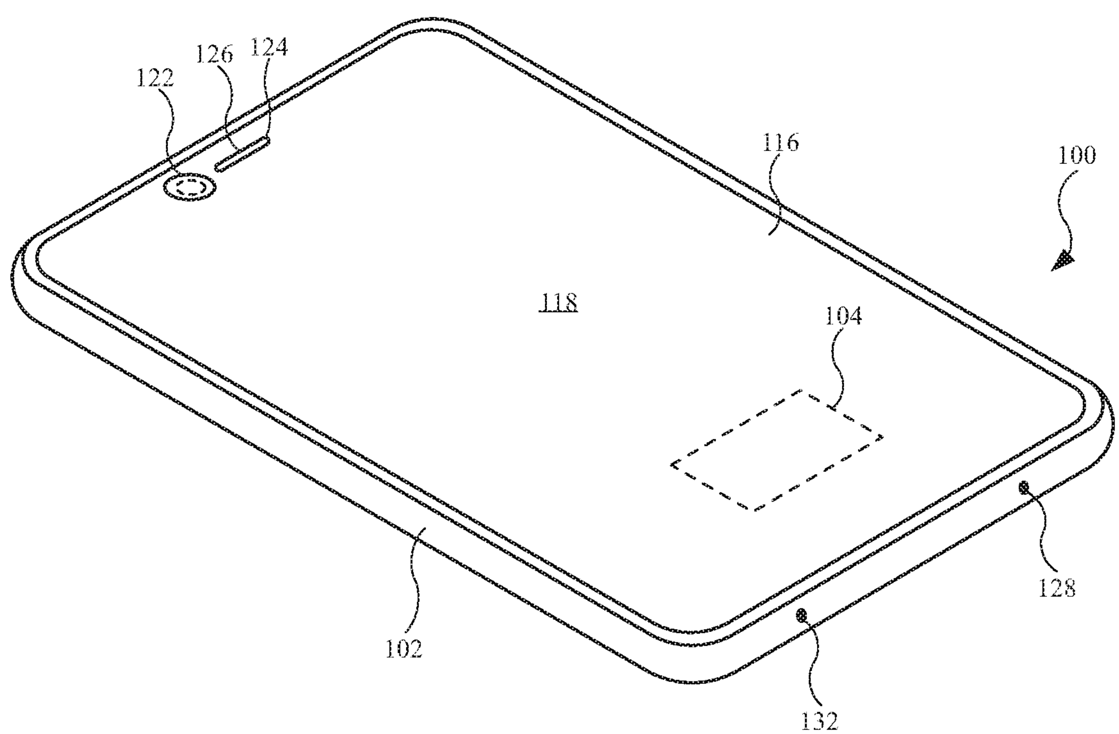
FIG. 1 illustrates a front perspective view of an embodiment of a portable electronic device, in accordance with some described embodiments.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The following disclosure relates to an electronic device, such as a mobile communication device that can include or take the form of a smartphone or a tablet computer device. Such devices can be used for photography and/or videography by capturing images with a camera provided by the electronic device. The electronic device can provide stimulus features for engaging a photography subject of images to be captured by the camera.

It can be desirable to capture an image of a subject under particular conditions. For example, it can be desirable to capture an image of the subject in a particular pose, with a gaze directed at the camera, and/or while smiling. It will be appreciated that certain subjects, such as children and pets, may not voluntarily provide such conditions. Accordingly, photographers may be required to attract the attention of the subject and provide incentives for the subject to look at the camera and smile. These efforts may be unsuccessful, depending on the willingness of the subject to cooperate. Even when successful, these efforts draw the subject's attention and gaze to the user, rather than to the camera. Where the user is not in line with the electronic device, the gaze of the subject will then be away from the camera, and the resulting image does not contain the subject gazing directly at the camera. Furthermore, these efforts by the user can distract the user from the primary task of operating the electronic device. As such, the user may not be ready to capture the image when the desired conditions occur.

It can be desirable to provide with the electronic device stimulus features for the benefit of the subject to be captured in an image. Such stimulus features can attract the attention of the subject toward the camera when provided by components that are integrated with or coupled to the electronic device. The stimulus features can attract the attention and gaze of the subject prior to and during capture of the image. The stimulus features can also be provided to the subject as a reward during and after capture of the image. These features allow the user of the electronic device to focus on operation of the electronic device.

As used herein, a stimulus feature is any output, emission, or event provided by the electronic device in a manner that is perceptible by a subject. For example, a stimulus feature can be any feature that is detectable by one or more senses (e.g., sight, hearing, smell, taste, and touch) of the subject. The stimulus feature can be provided in a manner that directs the attention (e.g., gaze) of the subject toward the electronic device. The stimulus feature can be provided in a manner that elicits a desired response (e.g., smiling, laughing) from the subject. As such, the stimulus feature can be provided to evoke a desired reaction in the subject. The stimulus can also be provided based, at least in part, on the activity of the subject. The stimulus feature need not be provided prior to a desired action by the subject. For example, the stimulus feature can be provided after and in response to certain actions performed by the subject. As such, the stimulus feature can be provided as a reward or incentive for a desired performance by the subject. Withholding the stimulus feature until such performance can motivate the subject to perform the desired actions (e.g., look at electronic device and smile). Accordingly, the stimulus feature can be provided regardless of the actions of the subject or based on the actions of the subject.

These and other embodiments are discussed below with reference to FIGS. 1-6. However, those skilled in the art will readily appreciate that the detailed description given herein with respect to these Figures is for explanatory purposes only and should not be construed as limiting.

FIG. 1 illustrates a front perspective view of an embodiment of a portable electronic device 100, in accordance with some described embodiments. In some embodiments, the portable electronic device 100 is a tablet computer device. In the embodiment shown in FIG. 1, the portable electronic device 100 is a mobile wireless communication device (a smartphone, for example).

The portable electronic device 100 may include a band 102 that defines an outer perimeter of the portable electronic device 100. The band 102 may include a metal, such as aluminum, stainless steel, or an alloy that includes at least one of aluminum or stainless steel. The band 102 may be composed of one or more sidewall components. As shown in FIG. 1, the band 102 includes one or more openings for a back speaker 132 and/or a back microphone 128. The openings may allow for transmission of acoustical energy (in the form of audible sound) into or out of the portable electronic device 100, which may be received by the back microphone 128 of the portable electronic device 100. Further, the opening may allow for transmission of acoustical energy (in the form of audible sound) out the portable electronic device 100, which may be generated by a back speaker 132 of the portable electronic device 100.

The portable electronic device 100 may further include a front display 116 that is protected by a front cover 118. The front display 116 can be viewed from outside the portable electronic device 100 through the front cover 118. The portable electronic device 100 can include a display surface and/or a touch panel for receiving inputs when contacted thereby. The portable electronic device 100 utilizes the display to render images to convey information to the user. The display can be configured to show text, colors, line drawings, photographs, animations, video, and the like. The front cover 118, the front display 116, and/or another component of the portable electronic device 100 can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types.

The front cover 118 may be formed from a transparent material, such as glass, plastic, sapphire, or the like. In this regard, the front cover 118 may be referred to as a transparent cover, a transparent protective cover, or a cover glass (when the front cover 118 includes glass). As shown in FIG. 1, the front cover 118 includes an opening for a front speaker 126 and/or a front microphone 124. The opening may allow for transmission of acoustical energy (in the form of audible sound) into or out of the portable electronic device 100, which may be received by the front microphone 124 of the portable electronic device 100. Further, the opening may allow for transmission of acoustical energy (in the form of audible sound) out the portable electronic device 100, which may be generated by a front speaker 126 of the portable electronic device 100. The front speaker 126 and/or the back speaker 132 can provide a stimulus feature by emitting sound for the benefit of the photography subject, as discussed further herein.

The portable electronic device 100 can include a front camera 122. As shown, the front camera 122 can be oriented to capture an image of a user when the user is facing the front display 116. The image of the user captured by the front camera 122 can be used for providing a stimulus feature to the photography subject, as discussed further herein. For example, the front camera 122 and/or related components can be provided with information related to object recognition, including facial recognition.

As shown in FIG. 1, the portable electronic device 100 can include a processor 104 with one or more processing units that include or are configured to access a memory having instructions stored thereon. The instructions or computer programs may be configured to perform one or more of the operations or functions described with respect to the portable electronic device 100. The processor 104 can be implemented as any electronic device capable of processing, receiving, or transmitting data or instructions. For example, the processor 104 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The memory can store electronic data that can be used by the portable electronic device 100. For example, the memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

The portable electronic device 100 can further include one or more other user interfaces for receiving input from and/or providing output to a user. For example, one or more buttons, dials, crowns, switches, or other devices can be provided for receiving input from a user. The user interfaces can include a speaker, a microphone, and/or a haptic device.

Figure 2:
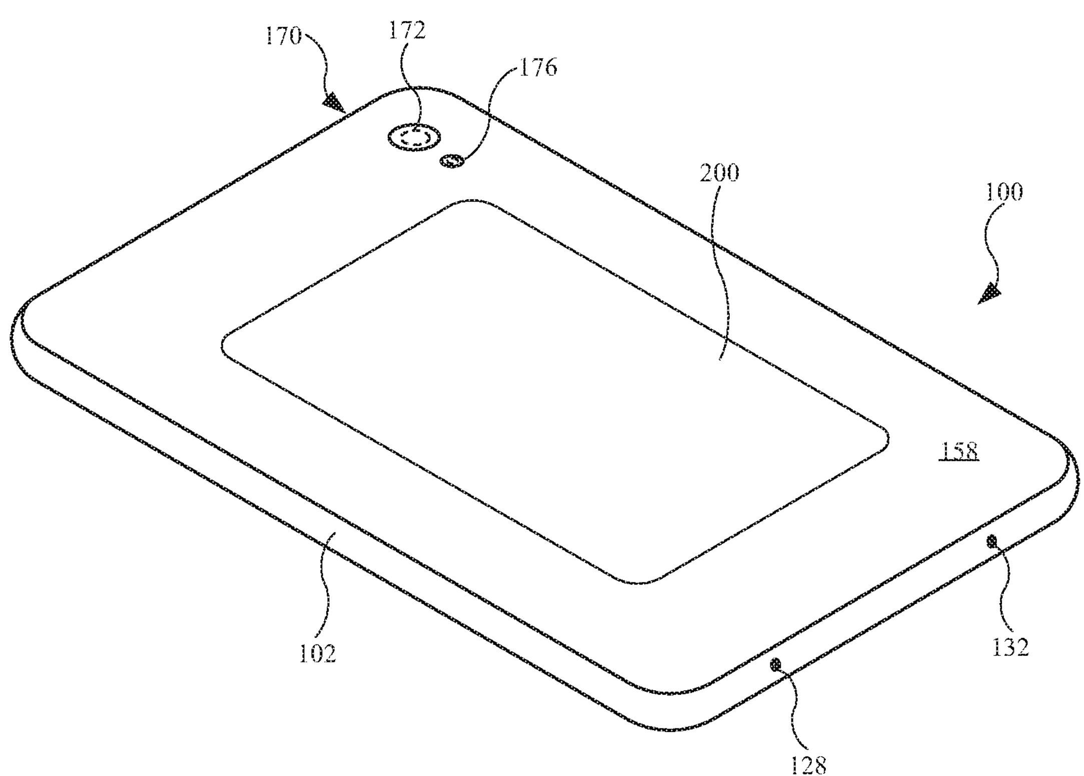
FIG. 2 illustrates a rear perspective view of the portable electronic device shown in FIG. 1.

FIG. 2 illustrates a rear perspective view of the portable electronic device 100 shown in FIG. 1. The portable electronic device 100 may further include a back cover 158 that couples with or is integral with the band 102. In this regard, the back cover 158 may combine with the band 102 to form an enclosure of the portable electronic device 100, with the enclosure (band 102 and back cover 158) defining an internal volume that carries several internal components, such as the processor 104, a battery assembly, a circuit board, a vision system, as non-limiting examples. The back cover 158 may include any material(s) previously described for the front cover 118 (shown in FIG. 1). Also, the front cover 118 (shown in FIG. 1) may be referred to as a "front protective cover" and the back cover 158 may be referred to as a "rear protective cover," as the front of the portable electronic device 100 is generally associated with the display assembly 116 (which is covered by the front cover 118), and the back of the portable electronic device 100 is generally associated with a rear wall, such as the back cover 158.

The portable electronic device 100 may further include a camera assembly 170. As shown, the camera assembly 170 may include one or more back cameras 172 and a light emitter 176. The light emitter 176 can provide additional lighting during an image capture event by the back camera 172. The light emitter 176 can further provide a stimulus feature by emitting light for the benefit of the photography subject, as discussed further herein. For example, the back camera 172 and/or related components can be provided with information related to object recognition, including facial recognition.

The portable electronic device 100 may further include a back display 200 coupled to or integrated with the back cover 158. The back display 200 can be viewed from outside the portable electronic device 100. The portable electronic device 100 utilizes the back display 200 to render images to convey information to the photography subject. The back display 200 can be configured to show text, colors, line drawings, photographs, animations, video, and the like. The back display 200 can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types. It will be appreciated that the back display 200 can be provided as an integral component of the portable electronic device 100 (e.g., integral with the back cover 158) or as part of a removable module. For example, the back display 200 can be part of or form a protective cover that attaches to the portable electronic device 100, wherein the back display 200 is operably connected to components of the portable electronic device 100, such as the processor 104.

Figure 3:
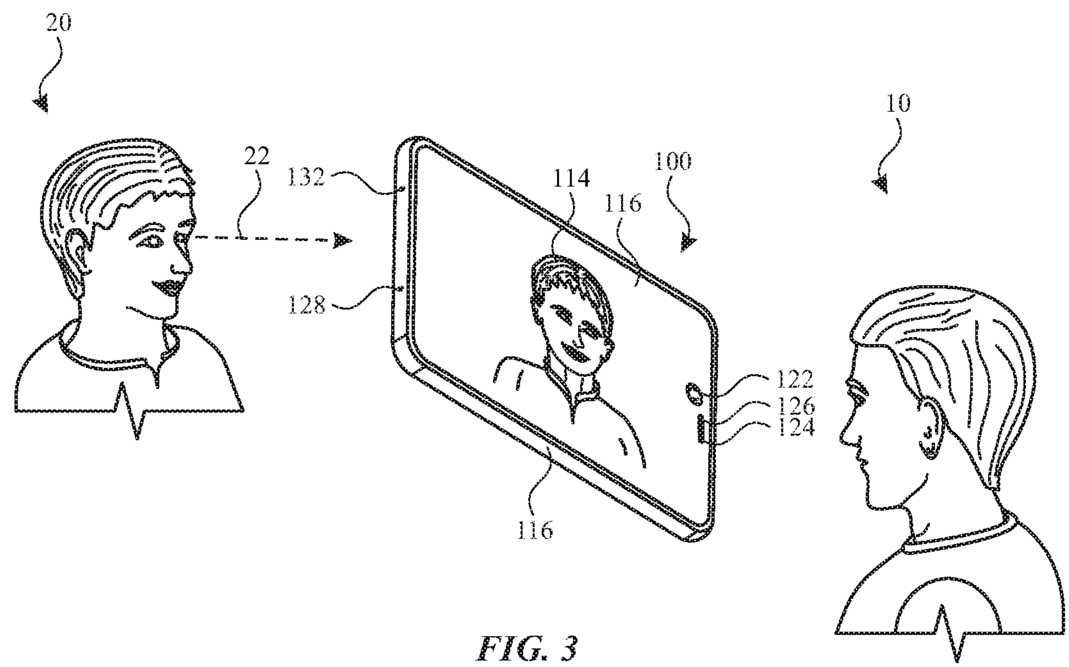
FIG. 3 illustrates a front perspective view of a portable electronic device in use by a user to capture an image of a subject.
Figure 4:
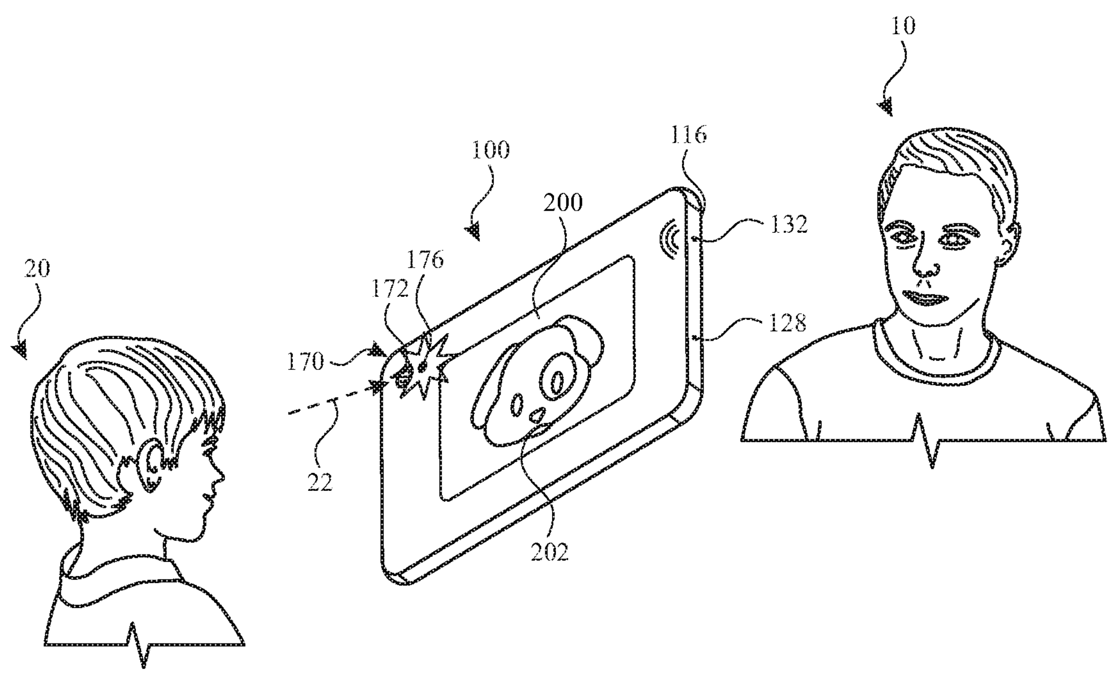
FIG. 4 illustrates a rear perspective view of the portable electronic device shown in FIG. 3 in use by a user to capture an image of a subject.

Referring now to FIGS. 3 and 4, a portable electronic device can be operated by a user to capture an image of a subject with the assistance of one or more stimulus features provided by the portable electronic device.

As shown in FIG. 3, a user 10 can operate a portable electronic device 100 to capture an image of a subject 20. The front display 116, the front camera 122, the front microphone 124, and/or the front speaker 126 can be generally directed toward and/or accessible to the user 10 during use of the portable electronic device 100. For example, the user 10 can operate one or more input devices, such as a touchscreen of the front display 116, to initiate and/or manage an image capturing program. During use, the front display 116 can show an image 114 of the subject 20 before, during, and/or after capture with a back camera facing the subject 20. The front camera 122 can capture an image of the user 10 for analysis to produce a stimulus feature for the subject, as discussed further herein.

As shown in FIG. 4, the subject 20 can direct its gaze toward the portable electronic device 100 to enjoy a stimulus feature provided thereby. The back display 200, the back camera 172, the light emitter 176, the back microphone 128, and/or the back speaker 132 can be generally directed toward and/or accessible to the subject 20 during use of the portable electronic device 100. The back camera 172 can capture an image of the subject 20 for display and/or recording.

The subject 20 can be oriented with respect to the portable electronic device 100 so that the gaze of the subject 20 is toward the back camera 172. As such, the portable electronic device 100 can be interposed between the user 10 and the subject 20. Such a position can provide the user 10 with the view of the front display 116 and the subject with the view of the back display 200 when the gaze direction 22 of the subject 20 is directed to the portable electronic device 100. Furthermore, such a position allows the front camera 122 to capture an image of the user 10 and allows the back camera 172 to capture an image of the subject. Accordingly, the is not required to peer around the portable electronic device 100 to see the subject, thereby allowing the user 10 to maintain focus on operation of the portable electronic device 100.

During use, the back display 200 can show a stimulus feature, such as a virtual avatar 202, before, during, and/or after capture of an image of the subject 20. The virtual avatar 202 can be a realistic representation of the user 10 based on an image captured by the front camera 122. This allows the subject 20 to see the user 10 without requiring the user 10 to peer around the portable electronic device 100.

Additionally or alternatively, as shown in FIG. 4, the back display 200 can be configured to display a cartoon representation of the user 10 (e.g., the virtual avatar 202 or digital puppet). Such a virtual avatar 202 that represents the user 10 may be considered an animoji, as it may look like an emoji character familiar to many smartphone users; however, it can be animated to mimic actual motions of the user 10. For example, the user 10 may be presented various available virtual avatar characters for selection. A user may select a virtual avatar 202 (e.g., a cartoon dog head). The portable electronic device 100 can begin capturing audio and/or video information (e.g., using the front camera 122 and/or the front microphone 124). In some cases, only video information is needed. The video information can be analyzed, and facial features (location, shape, size, etc.) of the user can be extracted. These extracted facial features can then be mapped to the virtual avatar 202 in real-time, such that the virtual avatar 202 displayed by the back display 200 appears to mirror facial features of the user 10. In some cases, the term real-time is used to indicate that the results of the extraction, mapping, rendering, and presentation are performed in response to each motion of the user 10 and can be presented substantially immediately. To the subject 20, it may appear as if they are looking at a cartoon representation of the user 10, with the image of the user's face being replaced with the virtual avatar 202. As such, actual speech from the user 10 can be heard directly by the subject 20 while watching the virtual avatar 202 match the facial features of the user 10. The resulting display can attract the attention of the subject 20 and help the subject 20 respond with the desired gaze direction, facial expressions (e.g., smiles), and/or other requested gestures and/or poses for capture in an image.

Additionally or alternatively, the stimulus feature provided by the back display 200 can include a video clip comprising visual and/or audio aspects. The video clip can be selected by the user 10. For example, a video clip that is of interest to the subject 20 can be displayed to attract the attention of the subject 20.

During use, the light emitter 176 can provide a stimulus feature, such as a light display, before, during, and/or after capture of an image of the subject 20. Such a light display can be provided in addition to or as an alternative to other stimulus features described herein. For example, a light emitter can provide a light display that includes one or more pulses (e.g., flashes) of light. The light can be provided in one or more colors and/or intensities for a desired sequence and duration of time. Multiple light emitters 176 can be included to provide a progressive display and/or animation. The light display can be coordinated with an audio output to further draw the attention of the subject 20. The resulting light display can attract the attention of the subject 20 and help the subject 20 respond with the desired gaze direction, facial expressions (e.g., smiles), and/or other requested gestures and/or poses for capture in an image.

During use, the back speaker 132 can show a stimulus feature, such as an audio output, before, during, and/or after capture of an image of the subject 20. Such an audio output can be provided in addition to or as an alternative to other stimulus features described herein. For example, the back speaker 132 (or another speaker) can provide a sound such as music, a prerecorded message, an alarm, animal noises, or any other sound that would draw the attention of the subject 20. The resulting audio output can attract the attention of the subject 20 and help the subject 20 respond with the desired gaze direction, facial expressions (e.g., smiles), and/or other requested gestures and/or poses for capture in an image.

Figure 5:
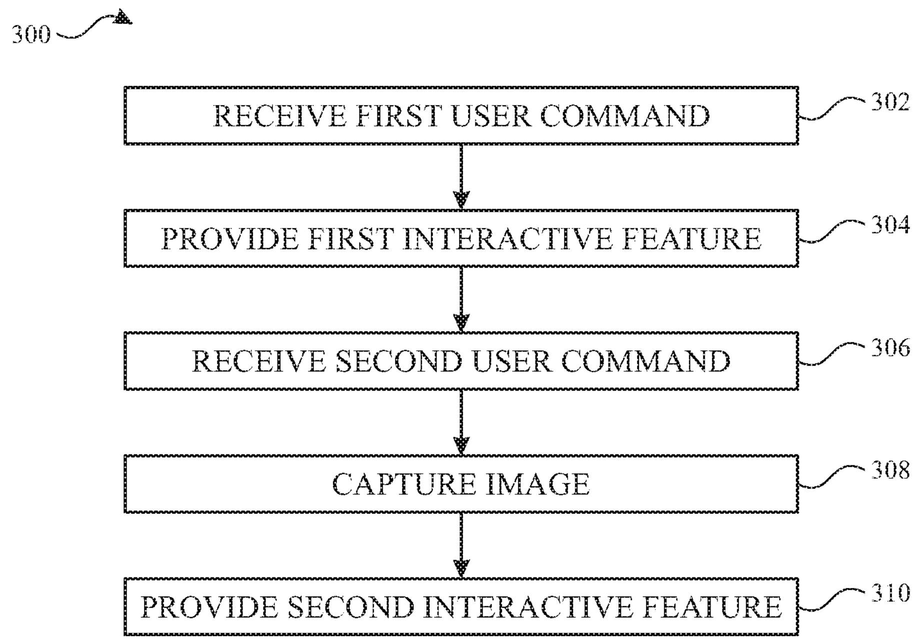
FIG. 5 illustrates a flow chart for a process having operations performed by a portable electronic device, in accordance with some described embodiments.
Figure 6:
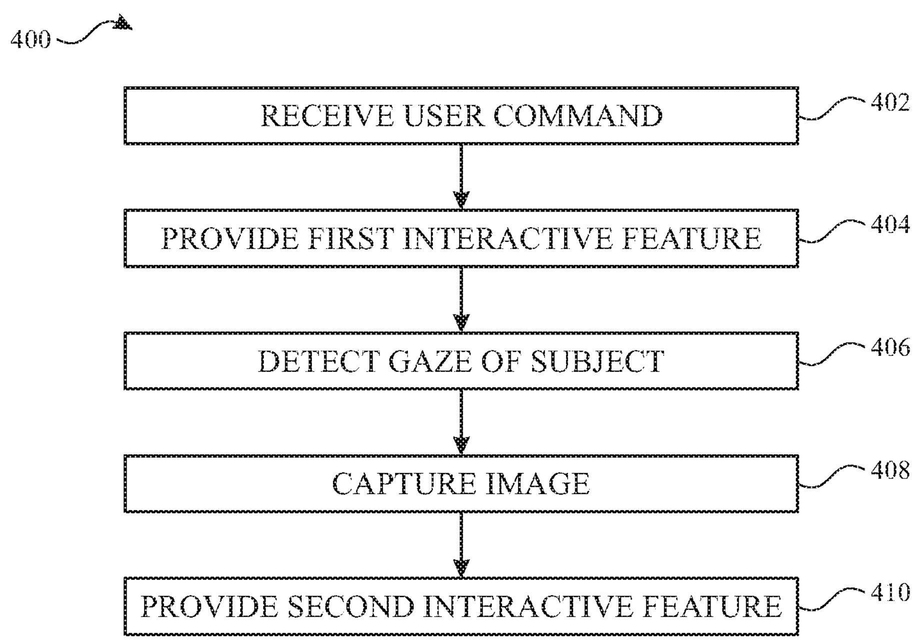
FIG. 6 illustrates a flow chart for a process having operations performed by a portable electronic device, in accordance with some described embodiments.

Referring now to FIGS. 5 and 6, methods of operating the portable electronic device are provided to achieve the results described herein.

As shown in FIG. 5, a method 300 is provided for operating the portable electronic device in response to one or more user commands. It will be understood that the method 300 illustrated in FIG. 5 is merely an example, and that a method can be performed with additional steps and/or fewer steps than those illustrated in FIG. 5.

In operation 302, the portable electronic device receives a first user command to initiate an image capturing session. Such a user command can include opening an app of the portable electronic device and/or making one or more selections on the portable electronic device. Additionally or alternatively, an image capturing session can be initiated automatically based on predetermined conditions.

In operation 304, and in response to the first user command, the portable electronic device can provide a first stimulus feature prior to capturing (e.g., recording) an image of the subject. The first stimulus feature can be one or more of those described herein. As the attention of the subject is drawn to the portable electronic device, a preview of the subject can be displayed as an image on a front display of the portable electronic device for viewing by a user. Based on the preview, the user can determine when it is appropriate or desirable to capture an image of the subject. Accordingly, the user can provide a second user command to capture the image.

It will be understood that the first stimulus feature is optional, and that no stimulus feature need be provided prior to capturing (e.g., recording) an image of the subject. For example, a stimulus feature may be withheld until the subject provides certain performance and the image is captured. As such, a stimulus feature can be a reward to incentivize performance by the subject.

In operation 306, the portable electronic device receives a second user command to capture an image of the subject. Additionally or alternatively, an image can be captured automatically based on predetermined conditions, as discussed further herein.

In operation 308, an image of the subject is captured. While images may be captured for providing a preview to the user, images captured during operation 308 can be recorded for later viewing, editing, and/or transmission. A confirmation can be provided to the user that the image is captured. For example, a visual and/or audio feature can be provided to the user.

A stimulus feature can be provided after and in response to certain actions performed by the subject and/or capturing an image of the subject. In operation 310, and in response to the second user command, the portable electronic device can provide a second stimulus feature after capturing (e.g., recording) the image of the subject. The second stimulus feature can be one or more of those described herein. As discussed above, the stimulus feature may be provided as a reward to incentivize performance by the subject. Accordingly, the receipt of the second user command to capture an image can be interpreted as approval from the user of the subject's performance, and the second stimulus feature can be provided automatically and in response. The second stimulus feature can be provided in addition to the first stimulus feature, as a modification of the first stimulus feature, or as a replacement for the first stimulus feature. For example, the first stimulus feature can be modified in response to a user command. By further example, a visual or auditory aspect of the first stimulus feature can be modified to produce the second stimulus feature. It will be understood that no second stimulus feature need be provided. Additionally or alternatively, the first stimulus feature can be discontinued or continue to be provided.

As shown in FIG. 6, a method 400 is provided for operating the portable electronic device based at least in part on detections performed by the portable electronic device. It will be understood that the method 400 illustrated in FIG. 6 is merely an example, and that a method can be performed with additional steps and/or fewer steps than those illustrated in FIG. 6.

In operation 402, the portable electronic device receives a user command to initiate an image capturing session. Such a user command can include opening an app of the portable electronic device and/or making one or more selections on the portable electronic device. Additionally or alternatively, an image capturing session can be initiated automatically based on predetermined conditions.

In operation 404, and in response to the user command, the portable electronic device can provide a first stimulus feature prior to capturing (e.g., recording) an image of the subject. The first stimulus feature can be one or more of those described herein.

It will be understood that the first stimulus feature is optional, and that no stimulus feature need be provided prior to capturing (e.g., recording) an image of the subject. For example, a stimulus feature may be withheld until the subject provides certain performance and the image is captured. As such, a stimulus feature can be a reward to incentivize performance by the subject.

In operation 406, the portable electronic device detects a feature of the subject to determine whether an image should be capture. For example, the portable electronic device can use the back camera to view the subject and detect whether the subject is facing the camera (e.g., a gaze direction), a facial feature, and/or a pose of the subject. For example, the portable electronic device can use facial recognition techniques to detect a portion of an image that corresponds to a face of the subject and the portion of the image that corresponds to eyes of the subject. The portable electronic device can determine, based on the location of the eyes relative to each other and/or other features of the face, whether the subject is facing the camera (e.g., providing a gaze in a direction of the camera). By further example, the portable electronic device can determine whether the subject's eyes are open (e.g., based on visibility of the pupil, iris, sclera, eyelid, etc.). By further example, the portable electronic device can determine whether the subject is smiling (e.g., based on visibility of the teeth, gums, lips, etc.). By further example, the portable electronic device can determine whether the subject is in a target pose (e.g., whether one or more of the subject's body parts are in a target position and/or orientation).

When one or more of the desired conditions is met, the portable electronic device can capture an image of the subject. The capture can occur without further input from the user. As such, after an image capturing session is initiated, the satisfaction of conditions as determined by the portable electronic device can be sufficient to effect image capture. The conditions for capturing an image can be preprogrammed, user-selected, or a combination thereof.

The provision of stimulus features can be altered based on the detection of the subject. For example, if the subject satisfies one or more detected conditions, one of more stimulus features can be initiated, continued, altered, or discontinued. By further example, if the subject does not satisfy one or more detected conditions, one of more stimulus features can be initiated, continued, altered, or discontinued. The conditions for controlling one or more stimulus features can be preprogrammed, user-selected, or a combination thereof.

In operation 408, an image of the subject is captured. While images may be captured for providing a preview to the user, images captured during operation 408 can be recorded for later viewing, editing, and/or transmission. A confirmation can be provided to the user that the image is captured. For example, a visual and/or audio feature can be provided to the user.

A stimulus feature can be provided after and in response to certain actions performed by the subject. In operation 410, and in response to the detection, the portable electronic device can provide a second stimulus feature after capturing (e.g., recording) the image of the subject. The second stimulus feature can be one or more of those described herein. As discussed above, the stimulus feature may be provided as a reward to incentivize performance by the subject. Accordingly, the receipt of the second user command to capture an image can be interpreted as approval from the user of the subject's performance, and the second stimulus feature can be provided automatically and in response. The second stimulus feature can be provided in addition to the first stimulus feature, as a modification of the first stimulus feature, or as a replacement for the first stimulus feature. For example, the first stimulus feature can be modified in response to an action of the subject. By further example, a visual or auditory aspect of the first stimulus feature can be modified to produce the second stimulus feature. As such, the stimulus features can optionally be interactive by providing feedback based on actions of the subject. It will be understood that no second stimulus feature need be provided. Additionally or alternatively, the first stimulus feature can be discontinued or continue to be provided.

Accordingly, the present disclosure provides an electronic device with stimulus features for the benefit of the subject to be captured in an image. Such stimulus features can attract the attention of the subject toward the camera when provided by components that are integrated with or coupled to the electronic device. The stimulus features can attract the attention and gaze of the subject prior to and during capture of the image. The stimulus features can also be provided to the subject as a reward during and after capture of the image. These features allow the user of the electronic device to focus on operation of the electronic device.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and magnets are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A portable electronic device comprising:

a first camera on a first side of the portable electronic device and configured to capture an image of a subject;

a second camera on a second side of the portable electronic device and configured to capture an image of a user;

a first display on the first side configured to display to the subject a stimulus feature based on only the image of the user captured by the second camera while capturing the image of the subject; and a second display on the second side of the portable electronic device and configured to display to the user only the image of the subject captured by the first camera.

2. The portable electronic device of claim 1, wherein: the stimulus feature comprises a virtual avatar; and the portable electronic device further comprises a processor configured to:

extract from the image of the user a facial feature associated with a face of the user; and apply the facial feature to the virtual avatar for display on the first display.

3. The portable electronic device of claim 2, wherein the processor is further configured to:

in response to a first user command, display the virtual avatar on the first display; and in response to a second user command provided after the first user command, capture the image of the subject and alter the virtual avatar.

4. The portable electronic device of claim 2, wherein the processor is further configured to:

in response to a user command, display the virtual avatar on the first display and detect, based on the image of the subject, whether the subject is facing the first camera; and when the subject is facing the first camera, capture the image of the subject and alter the virtual avatar.

5. The portable electronic device of claim 1, further comprising a processor configured to:

in response to a first user command, display the stimulus feature on the first display; and in response to a second user command provided after the first user command, capture the image of the subject.

6. The portable electronic device of claim 1, further comprising a processor configured to:

in response to a user command, display the stimulus feature on the first display and detect, based on the image of the subject, whether the subject is facing the first camera; and when the subject is facing the first camera, capture the image of the subject.

7. The portable electronic device of claim 1, further comprising a speaker configured to provide sound to the subject while capturing the image of the subject.

8. The portable electronic device of claim 1, further comprising a light emitter configured to provide light to the subject while capturing the image of the subject.

9. The portable electronic device of claim 1, wherein the portable electronic device is a smartphone and the second display comprises a touchscreen for receiving a user input.

10. A portable electronic device comprising:

a camera on a first side of the portable electronic device and configured to capture an image of a subject;

a display on a second side of the portable electronic device and configured to display to a user the image of the subject;

an audio or visual output device configured to provide a first stimulus feature and a second stimulus feature, the first stimulus feature and the second stimulus feature each comprising sound or light; and a processor configured to:

in response to a first user command, provide the first stimulus feature with the audio or visual output device; and in response to a second user command, capture the image and provide the second stimulus feature, different than the first stimulus feature with the audio or visual output device.

11. The portable electronic device of claim 10, wherein the processor is further configured to:

detect, based on the image of the subject, whether a gaze of the subject is directed to the camera; and when the gaze of the subject is directed to the camera, capture the image.

12. The portable electronic device of claim 10, wherein the processor is further configured to:

detect, based on the image of the subject, whether the subject is smiling; and when the subject is facing the camera and smiling, capture the image.

13. The portable electronic device of claim 10, wherein the audio or visual output device comprises a speaker configured to provide sound to the subject.

14. The portable electronic device of claim 10, wherein the audio or visual output device comprises a light emitter configured to provide light to the subject.

15. A portable electronic device comprising:

a camera on a first side of the portable electronic device and configured to capture an image of a subject;

a display on a second side of the portable electronic device and configured to display to a user the image of the subject;

an audio or visual output device configured to provide a first stimulus feature comprising sound or light; and a processor configured to:

in response to a user command and based on the image of the subject, provide the first stimulus feature and detect whether the subject is facing the camera; and in response to a detection that the subject is facing the camera, capture the image of the subject and provide a second stimulus feature, different than the first stimulus feature, with the audio or visual output device.

16. The portable electronic device of claim 15, wherein the processor is further configured to:

detect, based on the image of the subject, whether a gaze of the subject is directed to the camera; and when the gaze of the subject is directed to the camera, capture the image of the subject and provide the stimulus feature.

17. The portable electronic device of claim 15, wherein the processor is further configured to:

detect, based on the image of the subject, whether the subject is smiling; and when the subject is facing the camera and smiling, capture the image of the subject and provide the stimulus feature.

18. The portable electronic device of claim 15, wherein the audio or visual output device comprises a speaker configured to provide sound to the subject.

19. The portable electronic device of claim 15, wherein the audio or visual output device comprises a light emitter configured to provide light to the subject.

* * * * *